US008521485B1

(12) United States Patent
Alexander et al.

(10) Patent No.: US 8,521,485 B1
(45) Date of Patent: Aug. 27, 2013

(54) SIMULATION OF INTEGRATED CIRCUIT POWER GRID NETWORKS

(75) Inventors: Mark A. Alexander, San Francisco, CA (US); Austin Tavares, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 533 days.

(21) Appl. No.: 12/824,110

(22) Filed: Jun. 25, 2010

(51) Int. Cl.
*G06F 17/50* (2006.01)
*G06F 9/445* (2006.01)

(52) U.S. Cl.
USPC ....... 703/2; 703/6; 703/14; 716/104; 257/499

(58) Field of Classification Search
USPC ................ 703/2, 6, 14, 17; 716/5, 9, 104; 257/499
See application file for complete search history.

(56) References Cited

U.S. PATENT DOCUMENTS

| 6,370,678 | B1 * | 4/2002 | Culler ........................... 716/104 |
| 7,143,022 | B1 | 11/2006 | Wang et al. |
| 7,278,120 | B2 | 10/2007 | Rahmat et al. |
| 7,472,363 | B1 * | 12/2008 | Chandra ........................ 716/106 |
| 8,019,580 | B1 * | 9/2011 | Chandra et al. .................. 703/6 |
| 2008/0052654 | A1 | 2/2008 | Rahmat et al. |
| 2008/0140379 | A1 * | 6/2008 | Shah et al. ........................ 703/14 |
| 2009/0019411 | A1 * | 1/2009 | Chandra et al. ..................... 716/9 |
| 2009/0024347 | A1 * | 1/2009 | Chandra et al. ............... 702/130 |
| 2009/0024969 | A1 * | 1/2009 | Chandra ............................ 716/5 |
| 2009/0224356 | A1 * | 9/2009 | Chandra ........................ 257/499 |
| 2010/0236612 | A1 * | 9/2010 | Khajehoddin et al. ........ 136/252 |
| 2011/0313738 | A1 * | 12/2011 | Stamoulis et al. ................. 703/2 |
| 2012/0016652 | A1 * | 1/2012 | Stamoulis et al. ............. 703/14 |

OTHER PUBLICATIONS

Miersch et al., Time and Frequency Analysis of Signal and Power Noise of a Microcontroller (μC) plus its Packaging (LQFP+PCB), presented at DesignCon 2009, where DesignCon 2009 Conference occurred between Feb. 2-Feb. 5, 2009, Santa Clara, CA, 13 pp.

* cited by examiner

*Primary Examiner* — Thai Phan
(74) *Attorney, Agent, or Firm* — LeRoy D. Maunu

(57) ABSTRACT

Approaches for analyzing a power grid of an integrated circuit are described. In one embodiment, a method includes selecting at least one portion of the integrated circuit to be analyzed. A power grid model corresponding to the integrated circuit is retrieved from a database, and a first simulation of the programmable integrated circuit is performed. The first simulation generates a respective waveform of an electrical characteristic over time for each connection of a component within the selected portion to voltage supply or voltage ground. A simulation is performed of the power grid model using the respective waveforms as input stimulus for each connection in the selected portion.

20 Claims, 8 Drawing Sheets

SIMULATION OF INTEGRATED CIRCUIT POWER GRID NETWORKS

FIELD OF THE INVENTION

One or more embodiments of the present invention generally relate to the simulation of circuit designs, and more particularly to the simulation of power grid networks of circuit designs.

BACKGROUND

During the process of developing a circuit design, the behavior of the design is often simulated to verify correct behavior prior to physical implementation of the circuit. One source of behavioral discrepancy is the distributed effects of power delivery in a realized circuit design. As current passes through a component, a voltage perturbation results in the power grid network. The voltage perturbation can affect timing of the circuit because a perturbed supply voltage modifies the delay of components such as logic gates or interconnects. If the modified delays are not accounted for accordingly, the results of chip timing analyses can be erroneous. Other effects resulting from non-linear electrical characteristics of the components create additional fluctuations in voltage. These effects were generally ignored in older technologies because of relative slow chip speed and low integration density. However, as speed and density of circuits increase, the unintended effects caused by the parasitic electrical characteristics of components have become significant. Among other effects, inductance of connections to the power grid in combination with power grid capacitance can resonate when perturbed. It is desirable to simulate these effects to provide an accurate analysis of power grid performance.

Historically it has been difficult to derive a passive power grid model of a die due to its complexity. There has also been a lack of tools to address this task, since in older technology the distributed effects of power delivery could be ignored. However, over the last few years, silicon manufacturers and electronic design automation vendors have refined techniques to derive passive power grid models based on actual metal layer routing of a silicon die, and at this point are able to create power grid models with a useful level of accuracy in a reasonable amount of time.

Currently, however, the accuracy provided by running noise simulations of these power grid models is limited by the lack of a stimulus model of a sufficient level of detail or granularity. Simulation of the whole device at the transistor or gate level would provide the granularity necessary to account for the distributed aspects of the power grid and feedback, yet such a simulation is impractically large. Some level of abstraction is required to both provide a desired level of detail and complete simulation in a feasible amount of time with an available amount of computing power.

Some previous techniques for simulating non-ideal voltage in the power grid network performed a static or DC analysis. In these simulations, an average current is used to represent the actual current, and AC or time-variant characteristics are ignored. However, actual components of a circuit draw time-varying currents from the power supply network in performing state switching activities. These time varying currents give rise to time-varying voltage on the power network. Therefore, the static simulation does not provide an accurate representation of performance as it does not provide any transient voltage information. The results provided by the DC approach are not adequately representative as it cannot account for many physical effects such as those arising from the placement of de-coupling capacitors or the speed of the transitions. Further, the capacitance and inductance of the power grid does not impact the results of the static model, since only the resistance matters in the static DC simulation. In addition, the timing of the transitions of the components has no effect on the static simulation even though multiple components switching simultaneously cause significantly different results from non-simultaneous switching in an actual circuit.

Another approach is to group similar components together in an AC simulation to produce a single stimulus on the power grid network that is an average of the group. While gross approximations of current transients can be derived from measurements of voltage noise measured at some point in a passive power grid model, any distributed aspects of the power grid model will not be correctly simulated. The current stimulus and its effect on power grid voltages is distributed, however information about this distributed nature is not captured by the measurement of voltage at a single point, which often is not even on the die.

One or more embodiments of the present invention may address one or more of the above issues.

SUMMARY

One or more embodiments of the invention provide methods and apparatus for analyzing a power grid of an integrated circuit. In one embodiment, a method includes selecting at least one portion of the integrated circuit to be analyzed. A power grid model corresponding to the integrated circuit is retrieved from a database. A simulation of the programmable integrated circuit is performed on a programmed processor. The simulation generates a respective waveform of an electrical characteristic over time for each connection of a component within the selected portion to voltage supply or voltage ground. A simulation is performed using the power grid model with the respective waveforms as input stimulus for each connection in the selected portion.

In another embodiment, an article of manufacture includes a non-transitory processor-readable storage medium configured with processor-executable instructions for processing a circuit design. The instructions when executed by a processor cause the processor to select at least one portion of the integrated circuit to be analyzed. A power grid model corresponding to the integrated circuit is retrieved from a database. A simulation of the programmable integrated circuit is performed. The simulation generates a respective waveform of an electrical characteristic over time for each connection of a component within the selected portion to the power grid model. A simulation of the power grid model is performed with the respective waveforms as input stimulus for each connection in the selected portion.

It will be appreciated that various other embodiments are set forth in the Detailed Description and Claims that follow.

BRIEF DESCRIPTION OF THE DRAWINGS

Various aspects and advantages of one or more embodiments the invention will become apparent upon review of the following detailed description and upon reference to the drawings in which.

DETAILED DESCRIPTION OF THE DRAWINGS

Power grid models, which are based on actual metal layer routing of a silicon die, are now commonly provided by silicon manufacturers or electronic design automation vendors. These models enable users to accurately model the effect that a particular power grid may have on a design. During operation of a circuit, current flow through components of the circuit generates perturbation, such as noise, that propagates through the power grid. The propagating noises interact with each other and with the circuit, which may affect operation of components of the circuit. In order to model how propagating noises interact and determine the effect on various components, a detailed simulation using the circuit design is performed to determine the propagating noise that is generated. Simulation using the entire circuit design at the transistor or gate level is impractically large and could not be completed in a feasible time. One or more embodiments of the present invention improve the runtime of a power grid simulation by simulating a portion of the circuit design in detail to generate and store the waveforms generated by the components within that portion. Then a simulation is performed with the power grid model using the stored waveforms as simulation input.

In some embodiments, the generated waveforms are referred to as symbols and such terms are used interchangeably herein. The size of the selected portion dictates the number of waveforms or symbols that must be generated through simulation of the integrated circuit. The smaller the selected portion, the faster the simulation will run. Conversely, the larger the selected portion, the more accurate the extrapolation through symbol simulation will be. For example, if the detailed simulation was performed on the entire FPGA, the use of symbols would be trivial as behavior of the entire IC would essentially be simulated and played back. By performing detailed simulation on only a portion of the integrated circuit, a large savings in simulation runtime is realized with only a marginal increase in error. The size and location of the selected portion may be selected by a designer to satisfy a variety of objectives. For example, a designer may target simulation in a particular area where timing constraints and switching speed of the circuit design is a concern, such as a portion of the design mapped to the corners of a device. Based on results of the power grid simulation designers can better select between various power grid design options.

Figure 1:
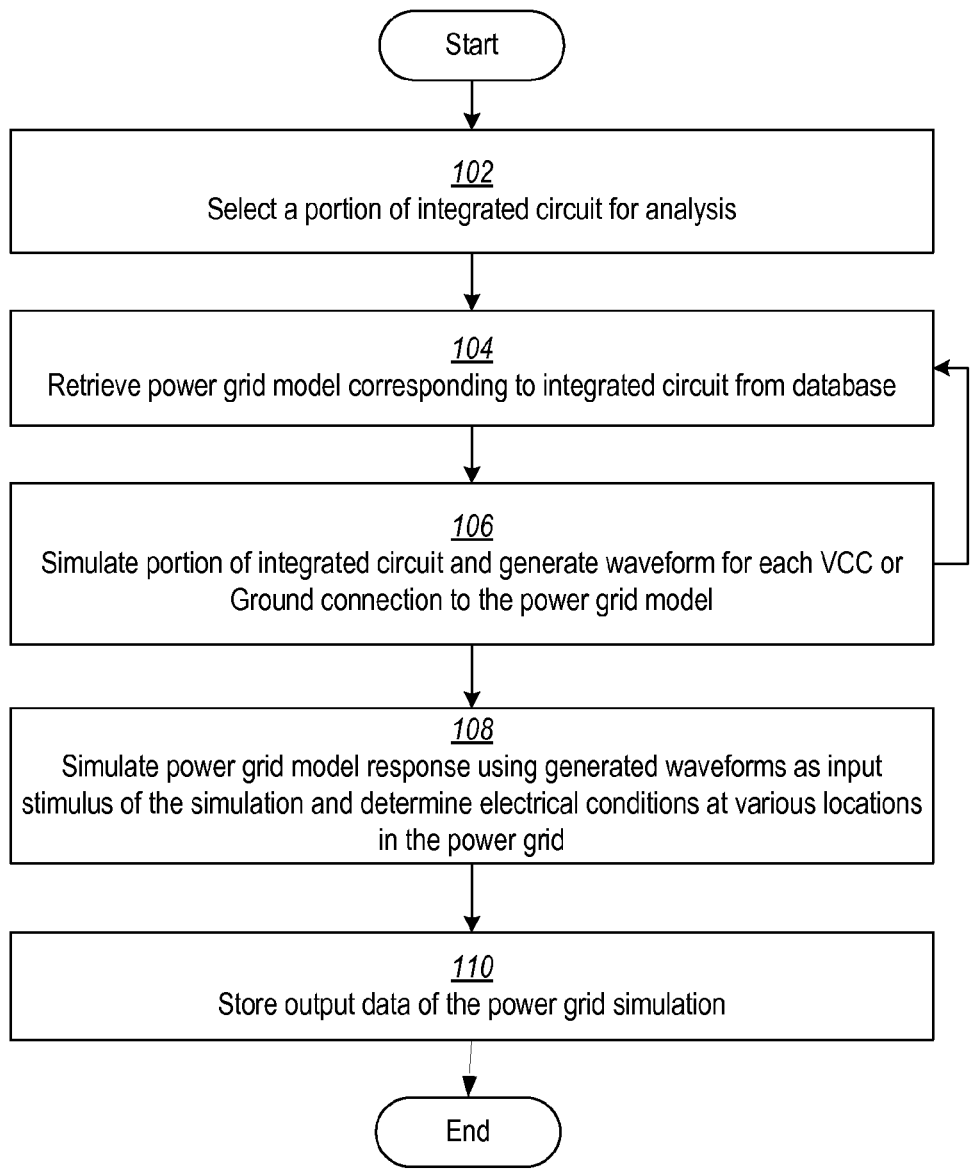
FIG. 1 shows a flowchart of a process for simulation of a power grid in accordance with an embodiment of the invention.

FIG. 1 shows a flowchart of a process for simulation of a power grid in accordance with an embodiment of the invention. A portion of the integrated circuit to be analyzed is selected at block 102. A power grid model corresponding to the integrated circuit is retrieved from a database at block 104. The database of models is provided by silicon manufacturers or electronic design automation vendors. Each of the models in the database corresponds to a particular power grid design or power grid incorporated into a particular programmable integrated circuit.

The selected portion of the integrated circuit active circuitry is simulated at block 106, and a current waveform is recorded in the time domain for each connection to Vcc or ground within the selected portion. In block 108, the power grid response is simulated using the power grid model retrieved from the database in block 104 and using the waveforms recorded in block 106 as simulation stimulus. Here, current waveforms are played back in the time domain as stimuli to the power grid model. The played back waveform represents the variation of current through the components as the component, or other components, switch on or off. During simulation of the power grid, aggregate currents through paths of interest within the power grid are captured at block 108 and stored at block 110.

In performing the simulation of the power grid with the generated waveforms, a passive power grid model corresponding to the integrated circuit is used. The model is passive in that a passive network of resistances, capacitances, and inductances represent the transmission lines of the voltage supply and ground networks. It may be preferable for the power grid model to be of a similar size to that of the area of the portion of the mapped circuit design to be simulated. However, it is often desirable to capture the propagation of the waveforms over the entire power grid network. Sometimes a power grid model of the size of interest can be obtained from a database. When the integrated circuit is tileable, such as with many FPGAs, the power grid model may be constructed from a model corresponding to one or more tiles of the integrated circuit.

Figure 2:
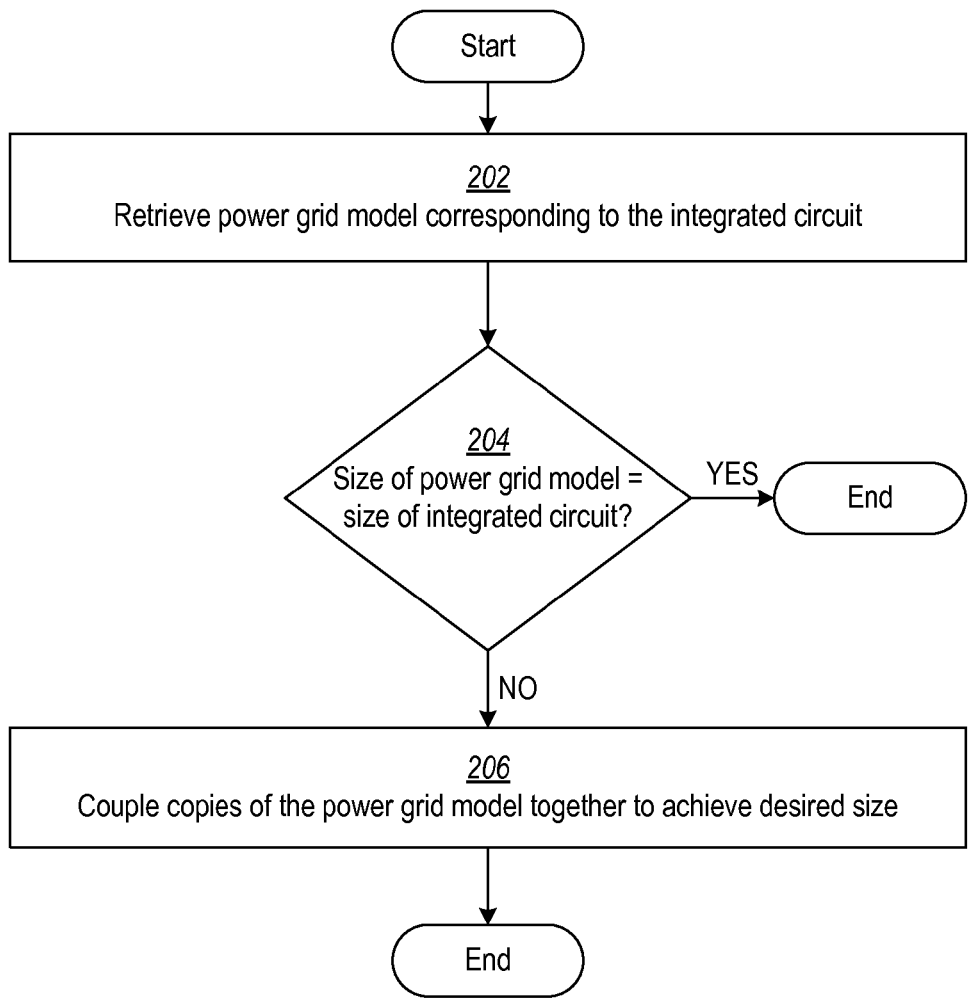
FIG. 2 shows a flowchart of the method of selecting and constructing a power grid model from tiles in accordance with an embodiment of the invention.

FIG. 2 shows a flowchart of a process of constructing a power grid model from tileable portions in accordance with an embodiment of the invention. A power grid model corresponding to the integrated circuit is retrieved from a database at 202. If the power grid model is not the desired size, at decision block 204, copies of the power grid model are combined to achieve a power grid network of the desired size at block 206.

Power grids are designed differently to meet the requirements presented by different integrated circuits. Each power grid design will vary depending on the necessary current flow, number of layers of the circuit to be powered, electromagnetic isolation requirements, etc. One or more embodiments of the present invention allows designers to simulate various power grid networks to determine how each power grid network design will affect the operation of the circuit.

Figure 3:
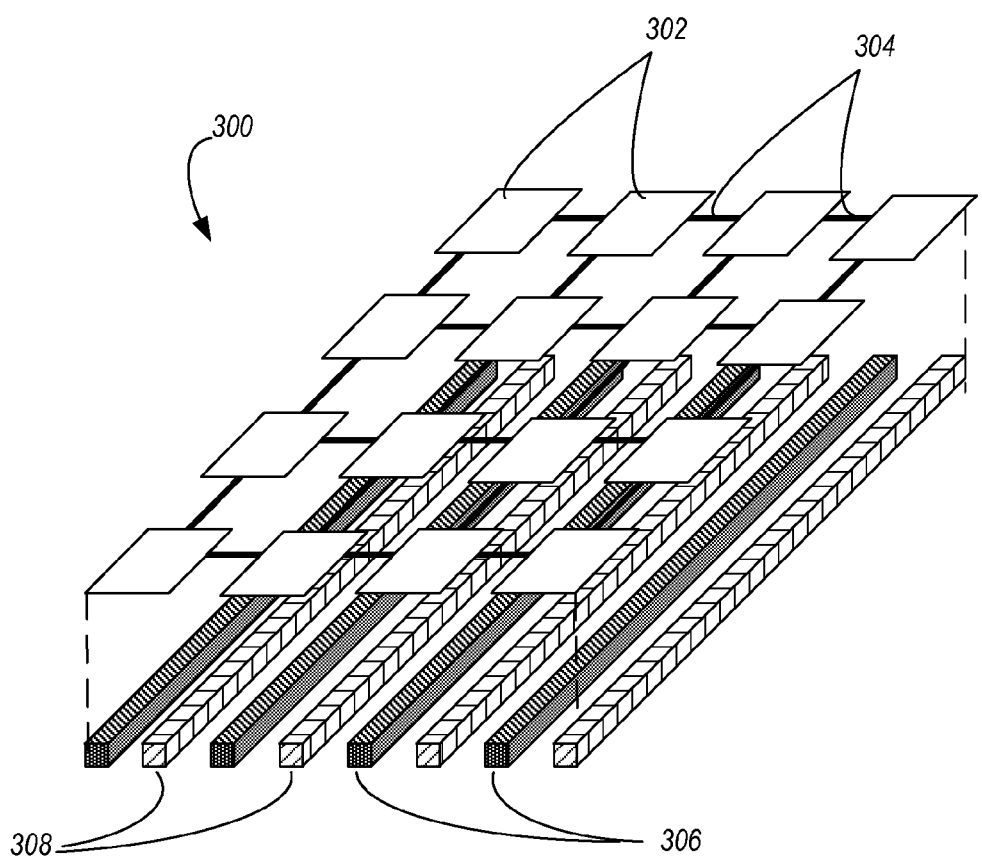
FIG. 3 illustrates an example power grid of an integrated circuit, which may be modeled in accordance an embodiment of the invention.

FIG. 3 illustrates an integrated circuit implemented with a typical power distribution network with parallel transmission lines in accordance with an embodiment of the invention. Programmable logic resources 302 are interconnected with routing resources 304. Components within programmable logic resources 302 are connected to the power grid network transmissions lines 306 and 308 (the connections are not shown in order to avoid obscuring the diagram). In the example configuration, ground 306 and Vcc 308 lines are parallel within the same layer. Other configurations may place ground and Vcc lines in separate layers.

Figure 4:
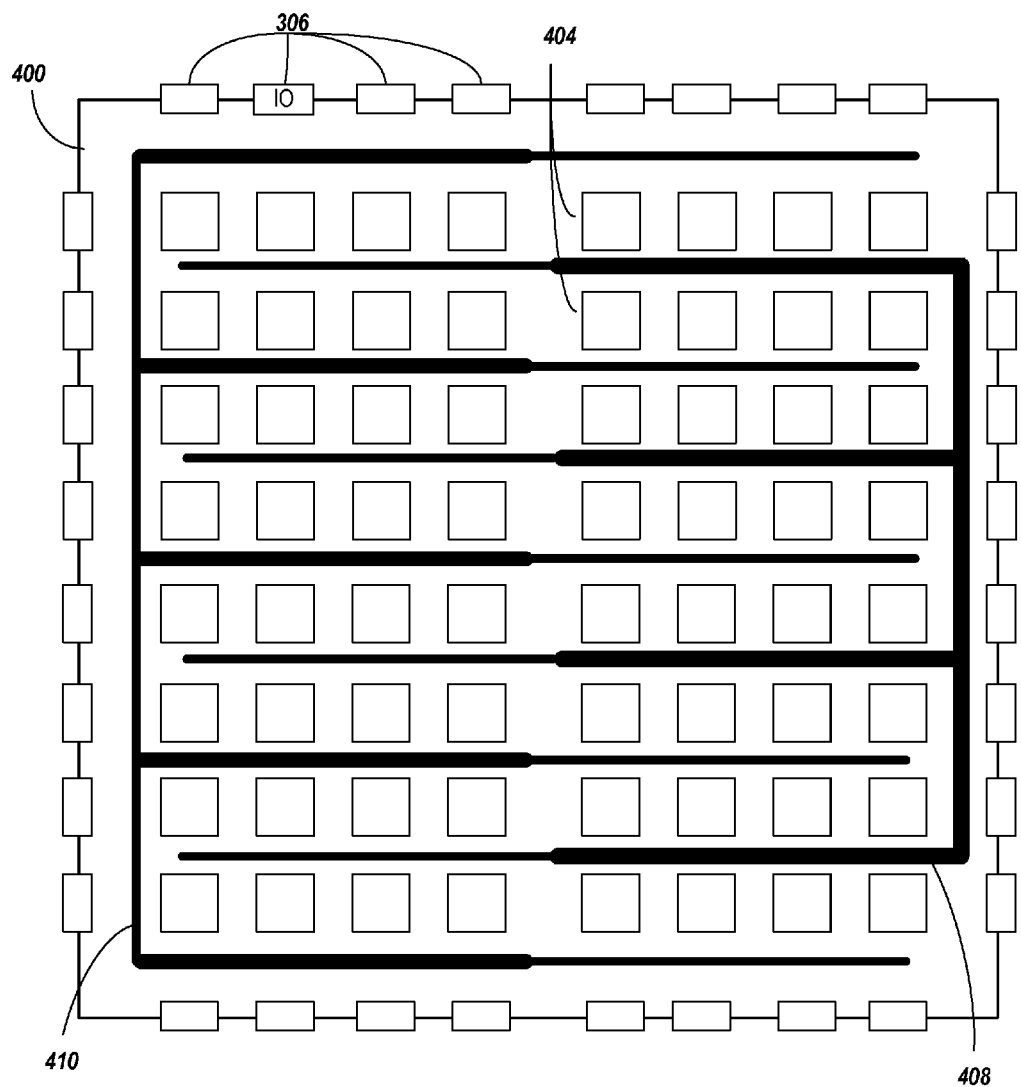
FIG. 4 illustrates a second example power grid of an integrated circuit, which may be modeled in accordance with an embodiment of the invention.

FIG. 4 illustrates a power distribution network arrangement wherein Gnd and Vcc lines are located in the same plane as the programmable logic resources in accordance with an embodiment of the invention. Vcc lines 408 and Gnd lines 410 are placed in parallel alternating configuration. In this configuration, Vcc and Gnd lines are respectively joined at opposite ends of the integrated circuit. It is understood that one or more embodiments of the present invention are equally applicable to various power grid distribution networks, and the examples shown are for illustrative purposes only.

Figure 5:
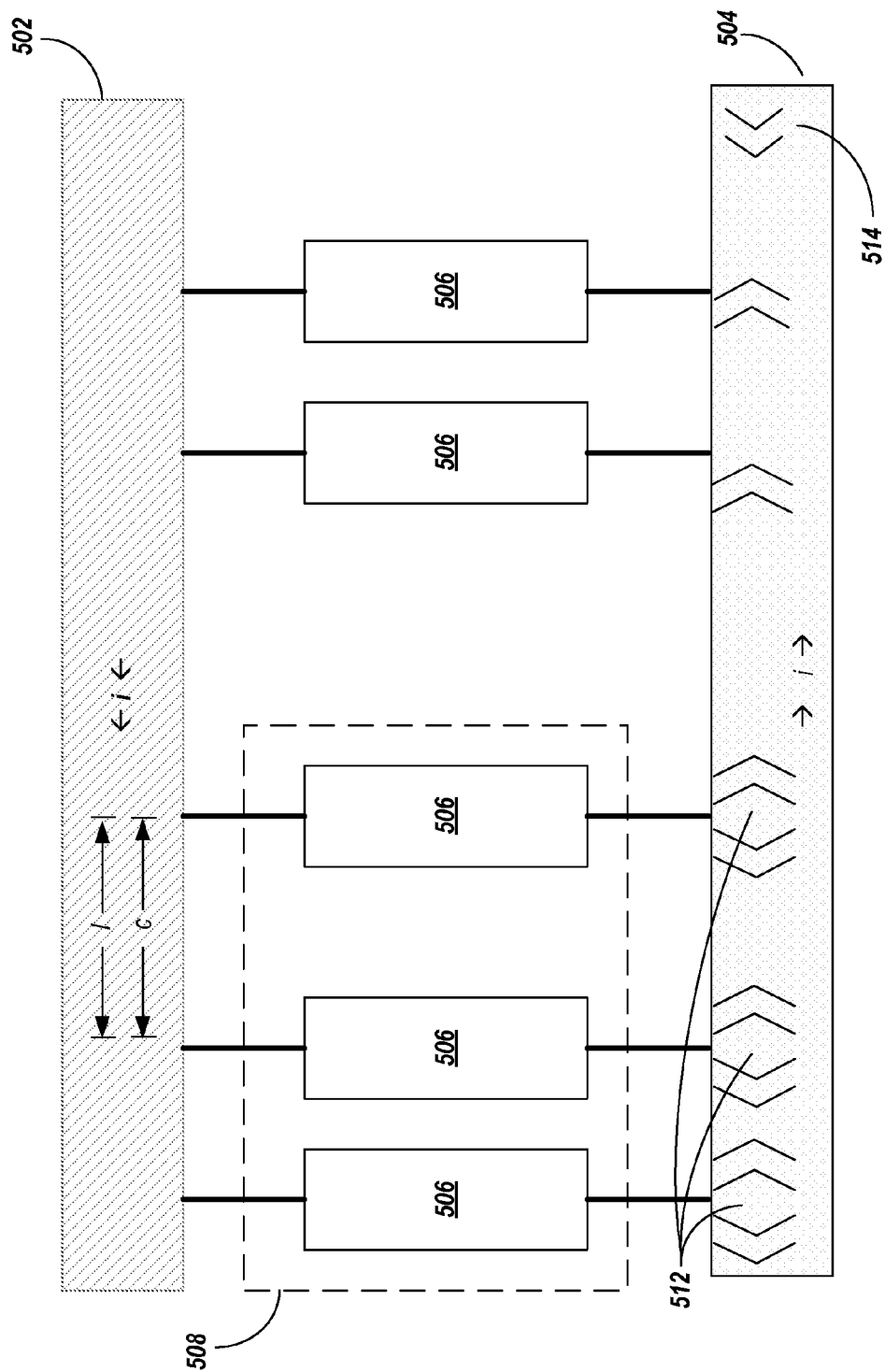
FIG. 5 illustrates several components connected to a power grid and signals generated in the power grid in accordance with an embodiment of the invention.

FIG. 5 shows a block diagram of several transistor-level components connected to a power grid network in accordance with an embodiment of the invention. Various components 506 are connected to Vcc line 502 and Gnd line 504. In this example, components within area 508 have been selected for simulation. The selected components produce signal waveforms 512 at connection points with the power grid at lines 502 and 504 (signal waveforms not illustrated at 502). As current (i) flows from power line 502 through components to ground line 504, the signals 512 are generated which propagate and reflect 514 through the power grid interacting with other generated signals. Signals may cancel or accumulate and reflect.

One or more embodiments of the present invention simulate components 506 within selected portion 508 in the time domain. The waveforms generated by the simulated components at the interface to both power line 502 and ground line 504 are recorded. These waveforms are then used as stimuli input to the power grid model. During simulation of the power grid model, input stimuli are generated based on the captured waveforms, which are injected into the power grid, resulting in propagating currents through power line 502 and ground line 504. Aggregate currents through paths of interest in the power grid network are captured along with resulting voltages at points of interest.

A symbol or waveform is generated for each connection to the power grid network within the selected portion of the integrated circuit. It is preferred that the duration of the detailed time domain simulation of the circuit design be long enough that the circuit reaches steady state. In other words, any ringouts from the initial transient would need to die down before the simulation to capture the symbol waveforms is ended. In this manner, the effect of ringouts are captured and simulated on the power grid network. If substantially identical waveforms are generated by two components 606 during time domain simulation of the integrated circuit, one symbol or stored waveform can be used to generate stimulus at the location of each of the two components during simulation of the power distribution network.

The time domain active circuit simulation for symbol generation is performed using an ideal power system. Any portions of the power system that cannot be removed from the active circuit simulation (e.g. intrinsic gate capacitances or the transistors) may remain as parts of the active circuit, but would need to be omitted from the passive power grid model. In other words, non-ideal effects should be accounted for either in the detailed time-domain circuit simulation, or in the power grid simulation, but not both.

Periodic pulse trains created by periodic switching events can be generated by replaying the waveform assigned to components after a period of delay approximately equal to the delay between switching events. In this manner, behavior at various data rates can be synthesized. Further, detailed functional behavior can be modeled if the logical switching behavior of the various transistor level components of the selected portion is known, as through logical simulation of the propagation of data through a datapath. Modeling of the switching behavior can allow customized simulations of transient current for specific implementations.

Time dithering that occurs in synchronous switching events due to clock skews and routing delays and the effects on noise generation can also be modeled using this method. Time dithering can be modeled by setting start time delays to selected symbols according to known clock skews corresponding to the various portions of the circuit.

The simulation model can also be configured to account for deviation in switching behavior of transistors under different instantaneous Vcc voltages. This behavior can be modeled by performing several time-domain simulations of the circuit design for various discrete Vcc values, and generating a unique set of symbols for each discrete voltage level. For example, it may be known that the Vcc supply can sag or bounce by up to 100 mV below or above its nominal value of 1.0V. The behavior of this example may be modeled by performing simulations, for example at the following discrete voltage levels: 0.90V, 0.92V, 0.94V, 0.96V, 0.98V, 1.00V, 1.02V, 1.04V, 1.06V, 1.08V, and 1.10V. At symbol simulation runtime, at the beginning of a given symbol's playback, a decision of which symbol to use is made based on the voltage of the power grid at the particular location at the time, based on the condition of the power grid due to prior switching activity. In this manner, macro-level feedback of the power grid is incorporated into the symbol simulation.

Figure 6:
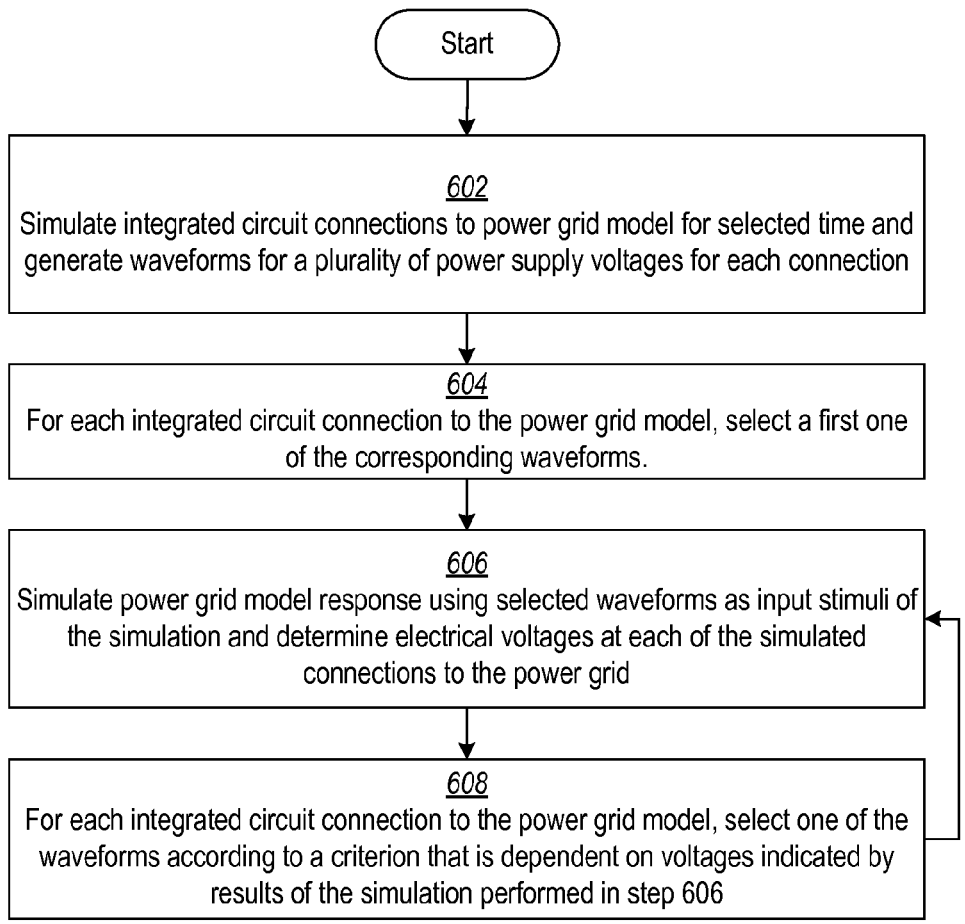
FIG. 6 shows a flowchart of a process for simulation of a power grid in accordance with an embodiment of the invention.

FIG. 6 shows a flowchart of a process for simulation of a power grid in accordance with an embodiment of the invention. Power grid connections in a portion of the integrated circuit to be analyzed are simulated for a selected period of time at block 602. As described above in FIG. 1, the selected portion of the integrated circuit active circuitry is simulated at block 602, and a current waveform is recorded in the time domain for each connection to Vcc or ground within the selected portion. In this embodiment, the simulation generates waveforms for a plurality of power supply voltages for each of the power grid connections in the portion of the integrated circuit.

For each integrated circuit connection to the power grid model, an initial, corresponding one of the waveforms generated in block 602 is selected at block 604. A power grid response is simulated at block 606 using a power grid model and the waveforms, which were selected at block 604, as input stimuli. For each simulated power grid connection, one of the corresponding waveforms generated in block 602 is selected at block 608 according to a criterion that is dependent on voltages indicated by results of the simulation performed in block 606.

Similarly, the simulation model can be configured to account for the switching behavior of transistors under discrete rates of Vcc supply voltage change (dv/dt). In the same manner described above, at each given discrete voltage, a symbol can be created for various voltage slopes dv/dt. For example, if nine voltage slopes are used in conjunction with the 11 discrete voltage levels, 99 symbols corresponding to 99 different voltage states would be generated. In one embodiment, a waveform may be selected for each simulated power grid connection according to a criterion that is dependent on a voltage rate of change indicated by results of the simulation performed in a manner similar to that shown in FIG. 6.

Figure 7:
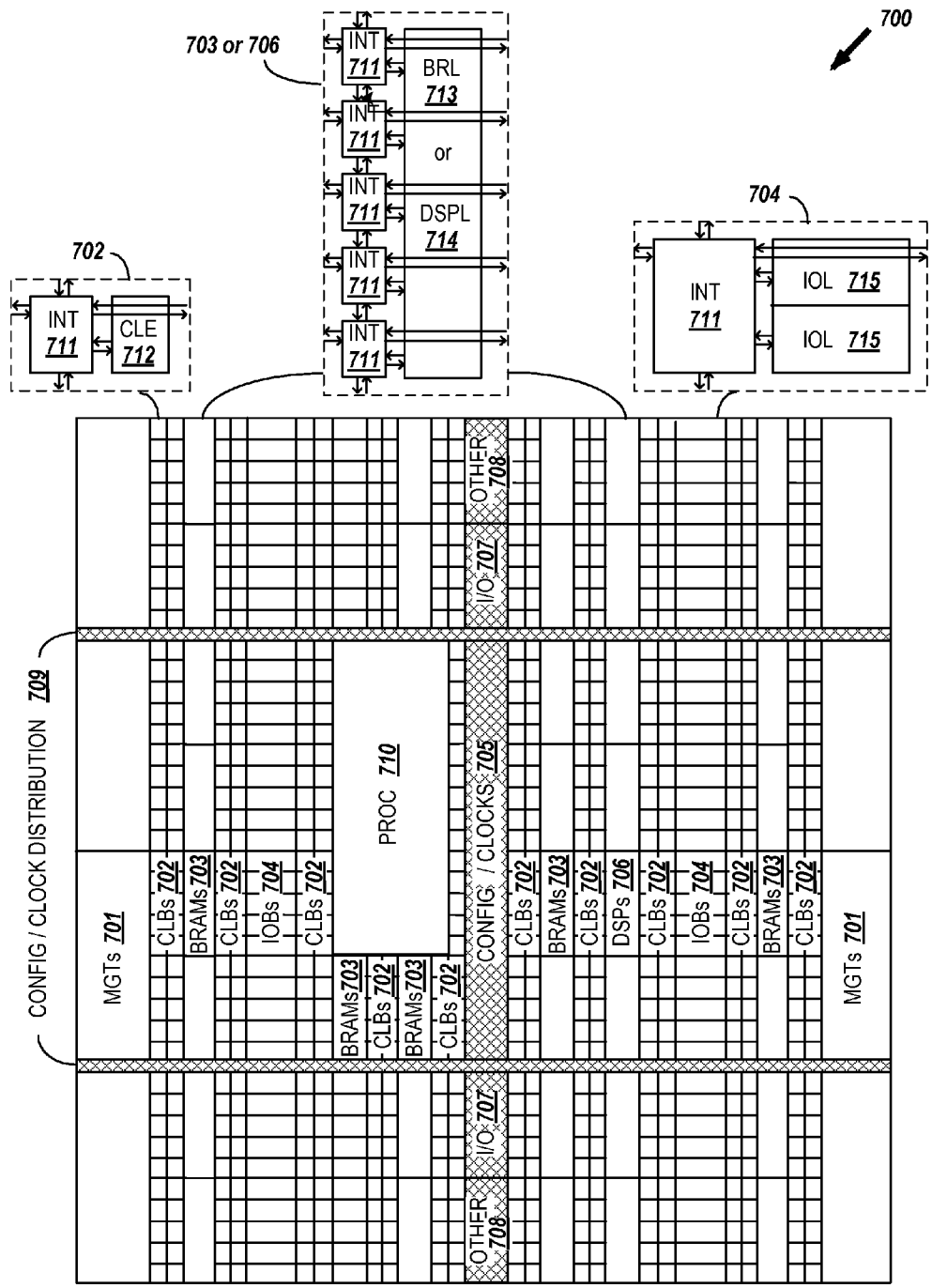
FIG. 7 illustrates an example programmable logic device that may be simulated to generate symbol waveform stimulus in accordance with an embodiment of the present invention.

FIG. 7 is a block diagram of an example programmable integrated circuit that may be simulated in accordance with one or more embodiments of the invention. Specifically, FIG. 7 illustrates an FPGA architecture 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/Os) 707, for example, e.g., clock ports, and other programmable logic 708 such as digital clock managers, analog-to-digital converters, system monitoring logic, and so forth. Some FPGAs also include dedicated processor blocks (PROC) 710.

In some FPGAs, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic plus a single programmable interconnect element NT 711. A BRAM 703 can include a BRAM logic element (BRL) 713 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 706 can include a DSP logic element (DSPL) 714 in addition to an appropriate number of programmable interconnect elements. An IOB 704 can include, for example, two instances of an input/output logic element (IOL) 715 in addition to one instance of the programmable interconnect element INT 711. As will be clear to those of skill in the art, the actual I/O pads connected, for example, to the I/O logic element 715 are manufactured using metal layered above the various illustrated logic blocks, and typically are not confined to the area of the input/output logic element 715.

In the pictured embodiment, a columnar area near the center of the die (shown shaded in FIG. 7) is used for configuration, clock, and other control logic. Horizontal areas 709 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear, to facilitate the efficient implementation of user logic.

Figure 8:
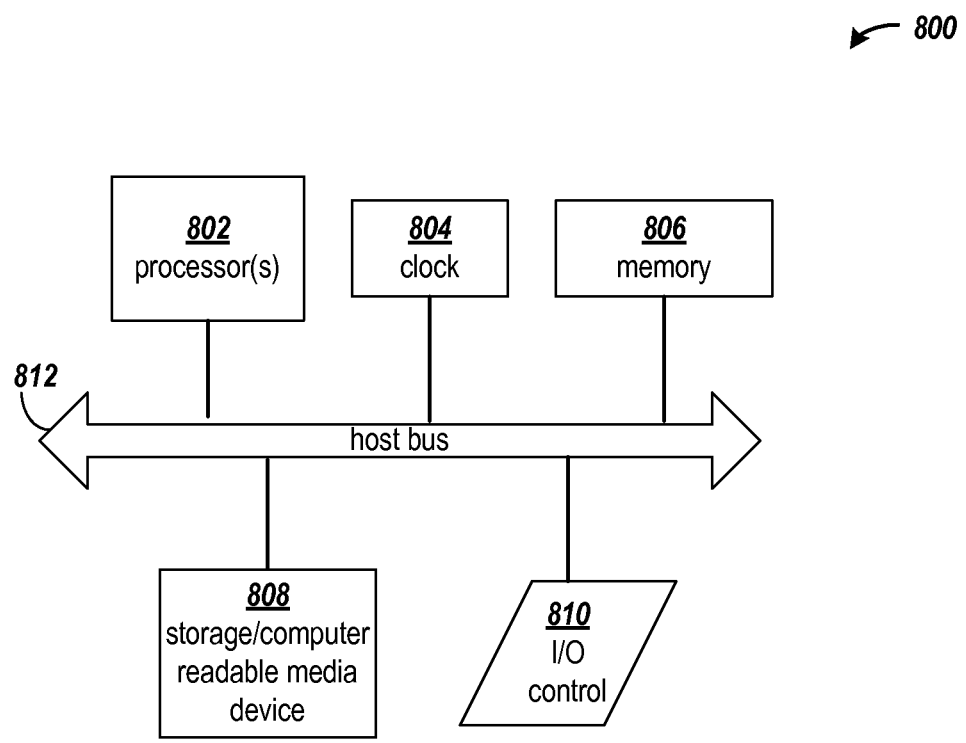
FIG. 8 illustrates a computing architecture in accordance with an embodiment of the invention, which may be configured to implement the processes of one or more embodiments of the invention.

FIG. 8 is a block diagram of an example computing arrangement which may be configured to implement one or more of the processes described herein. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Processor computing arrangement 800 includes one or more processors 802, a clock signal generator 804, a memory unit 806, a storage unit 808, and an input/output control unit 810 coupled to host bus 812. The arrangement 800 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 802 may be one or more general purpose processors, or a combination of one or more general purpose processors and suitable co-processors, or one or more specialized processors (e.g., RISC, CISC, pipelined, etc.). One or more blocks of the process shown in FIG. 1 may be executed on the processor 802.

The memory arrangement 806 typically includes multiple levels of cache memory, a main memory. The storage arrangement 808 may include local and/or remote persistent storage such as provided by magnetic disks (not shown), flash, EPROM, or other non-volatile data storage. The storage unit may be read or read/write capable. Further, the memory 806 and storage 808 may be combined in a single arrangement.

The processor arrangement 802 executes the software in storage 808 and/or memory 806 arrangements, reads data from and stores data to the storage 808 and/or memory 806 arrangements, and communicates with external devices through the input/output control arrangement 810. These functions are synchronized by the clock signal generator 804. The resource of the computing arrangement may be managed by either an operating system (not shown), or a hardware control unit (not shown).

The present invention is thought to be applicable to a variety of systems for simulation of integrated circuits. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for analysis of a power grid of an integrated circuit, comprising:

selecting at least one portion of the integrated circuit to be analyzed;

retrieving a power grid model corresponding to the integrated circuit from a database;

performing, using a processor, a simulation of the integrated circuit on a programmed processor, the simulation generating a respective waveform of an electrical characteristic over time for each connection of a component within the selected portion to voltage supply or voltage ground; and performing a simulation of the power grid model on a programmed processor, the simulation of the power grid model using the respective waveforms as input stimulus for each connection in the selected portion.

2. The method of claim 1, wherein a single waveform is used as input stimulus in the simulation of the power grid model for substantially identical waveforms generated in the simulation of the integrated circuit.

3. The method of claim 1, wherein the electrical characteristic is current flow.

4. The method of claim 1, wherein the electrical characteristic is voltage.

5. The method of claim 1, wherein a corresponding plurality of waveforms is generated for each connection in the selected portion, including at least a first waveform generated from simulating the circuit with a first supply voltage, and a second waveform generated from simulating the circuit with a second supply voltage.

6. The method of claim 5, further comprising:
for each connection in the selected portion, selecting one of the corresponding plurality of waveforms according to a criterion that is dependent on voltage levels indicated by the results of the simulation of the power grid model; and
performing a second simulation of the power grid model on the programmed processor, the second simulation of the power grid model using selected waveform as input stimulus for the corresponding connection in the selected portion.

7. The method of claim 1, wherein at a corresponding plurality of waveforms is generated for each connection in the selected portion, including at least a first waveform generated from simulating the circuit with a supply voltage changing at a first rate, and a second waveform generated from simulating the circuit with a supply voltage changing at a second rate.

8. The method of claim 7, further comprising:
for each connection in the selected portion, selecting one of the corresponding plurality of waveforms according to a criterion that is dependent on a rate of voltage change indicated by the results of the simulation of the power grid model; and
performing a second simulation of the power grid model on the programmed processor, the second simulation of the power grid model using the selected waveform as input stimulus for the corresponding connection in the selected portion.

9. The method of claim 1, wherein a time at which a waveform is used by the simulation of the power grid model as input stimulus is delayed by a time offset for at least one waveform during the simulation of the power grid model.

10. The method of claim 1, wherein the power grid model comprises a voltage supply network and a voltage ground network.

11. The method of claim 1, wherein the connections of two or more components are simulated concurrently.

12. The method of claim 1, wherein the power grid model selected is equal in size to the integrated circuit.

13. The method of claim 1, wherein multiple copies of the retrieved power grid model are coupled together to construct a power grid model equal in size to the selected portion of the integrated circuit.

14. The method of claim 1, wherein the power grid model is a passive power grid model.

15. The method of claim 1, wherein an ideal power source is used for the simulation that generates the respective waveforms.

16. The article of claim 15, wherein the instructions are configured to cause the processor to associate substantially identical waveforms with a single identifier.

17. The article of claim 15, wherein the instructions are configured to cause the processor to generate a plurality of waveforms for each connection in the selected portion, including at least a first waveform generated from simulating the circuit with a first supply voltage, and a second waveform generated from simulating the circuit with a second supply voltage.

18. An article of manufacture, comprising:
a non-transitory processor-readable storage medium configured with processor-executable instructions for processing a circuit design, the instructions when executed by a processor causing the processor to:
select at least one portion of the integrated circuit to be analyzed;
retrieve a power grid model corresponding to the integrated circuit from a database;
perform a simulation of the integrated circuit, the simulation generating a respective waveform of an electrical characteristic over time for each connection of a component within the selected portion to the power grid model; and
perform a simulation of the power grid model with the respective waveforms as input stimulus for each connection in the selected portion.

19. The article of claim 18, wherein the instructions are configured to cause the processor to time offset at least one waveform during the simulation of the power grid model.

20. The article of claim 18, wherein the instructions are configured to cause the processor to simulate the connections of two or more components in aggregate.

* * * * *